(12) United States Patent
Urankar et al.

(10) Patent No.: US 11,308,167 B2
(45) Date of Patent: Apr. 19, 2022

(54) DYNAMICALLY RENDERING VERY LARGE MULTI-FORMAT DOCUMENTS

(71) Applicant: Verizon Patent and Licensing Inc., Arlington, VA (US)

(72) Inventors: Aniruddha Ramchandra Urankar, Irving, TX (US); Narayanasamy Rengasamy, Flower Mound, TX (US); Dhanraj J. Nair, Flower Mound, TX (US); Muthu Karuppan Ramanathan, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/437,861

(22) Filed: Jun. 11, 2019

(65) Prior Publication Data

US 2020/0394230 A1     Dec. 17, 2020

(51) Int. Cl.
| | |
|---|---|
| *G06F 16/93* | (2019.01) |
| *G06F 16/903* | (2019.01) |
| *G06F 12/0802* | (2016.01) |
| *G06F 3/16* | (2006.01) |
| *G06F 40/106* | (2020.01) |
| *G06F 40/123* | (2020.01) |

(52) U.S. Cl.
CPC .............. *G06F 16/93* (2019.01); *G06F 3/16* (2013.01); *G06F 12/0802* (2013.01); *G06F 16/90344* (2019.01); *G06F 40/106* (2020.01); *G06F 40/123* (2020.01); *G06F 2212/1024* (2013.01); *G06F 2212/455* (2013.01)

(58) Field of Classification Search
CPC ............ G06F 16/90344; G06F 40/123; G06F 40/106; G06F 3/16; G06F 12/0802; G06F 16/93; G06F 40/16; G06F 2212/455; G06F 2212/1024

See application file for complete search history.

(56) References Cited

U.S. PATENT DOCUMENTS

| | | | |
|---|---|---|---|
| 9,772,979 B1* | 9/2017 | Young | G06F 16/9574 |
| 2002/0099739 A1* | 7/2002 | Fischer | G06F 16/9577 |
| | | | 715/239 |
| 2005/0223321 A1* | 10/2005 | Mather | G06F 12/10 |
| | | | 715/251 |
| 2007/0113171 A1* | 5/2007 | Behrens | G06F 15/7842 |
| | | | 715/239 |

(Continued)

*Primary Examiner* — Kyle R Stork

(57) ABSTRACT

A device may request an electronic document having a first size that fails to satisfy a memory constraint associated with a document viewer application executing on the device. The device may receive, from a document rendering platform, information related to a current segment of the electronic document and a set of additional segments of the electronic document, which may collectively have a second size that satisfies the memory constraint associated with the document viewer application. The device may render a first set of pages in the current segment of the electronic document using the document viewer application and store the set of additional segments in a cache associated with the document viewer application. The device may render a second set of pages contained in the cached set of additional segments based on a user navigating to a boundary of the current segment using the document viewer application.

20 Claims, 9 Drawing Sheets

(56) References Cited

U.S. PATENT DOCUMENTS

| | | | | |
|---|---|---|---|---|
| 2010/0287460 A1* | 11/2010 | Denoual | ............... | G06F 40/149 |
| | | | | 715/234 |
| 2011/0047156 A1* | 2/2011 | Knight | ................... | G06F 16/40 |
| | | | | 707/737 |
| 2012/0079374 A1* | 3/2012 | Gaddis | ................ | G06F 16/9577 |
| | | | | 715/269 |
| 2014/0068408 A1* | 3/2014 | Le Chevalier | ........ | G06F 40/169 |
| | | | | 715/234 |
| 2016/0026612 A1* | 1/2016 | Zhang | ................... | G06F 40/151 |
| | | | | 715/234 |
| 2016/0059609 A1* | 3/2016 | Javidan | ................. | B42D 1/007 |
| | | | | 446/150 |
| 2016/0350283 A1* | 12/2016 | Carus | ..................... | G06F 40/30 |
| 2017/0134611 A1* | 5/2017 | Thomas | ................ | G06K 9/228 |
| 2017/0337177 A1* | 11/2017 | Maxwell, III | ...... | G06F 16/9535 |
| 2017/0372439 A1* | 12/2017 | Smith | .................. | G06K 9/3275 |
| 2018/0157629 A1* | 6/2018 | Tuli | ....................... | G06F 40/14 |
| 2018/0176409 A1* | 6/2018 | Smith | ................ | H04N 1/00809 |
| 2019/0180415 A1* | 6/2019 | Lee | ...................... | G06K 9/3275 |
| 2019/0342240 A1* | 11/2019 | Garrido | ................ | G06F 3/0484 |

* cited by examiner

DYNAMICALLY RENDERING VERY LARGE MULTI-FORMAT DOCUMENTS

BACKGROUND

An electronic document refers to information stored in a file formatted in a manner that requires a computer or other electronic device to display, interpret, and/or otherwise process the information. In some cases, an electronic document may be viewed using a document viewer application that presents the information recorded in the file in a human-readable or printer-friendly form. For example, the document viewer application can be used to display the information stored in the file on a screen, to print the information, and/or the like.

DETAILED DESCRIPTION OF PREFERRED EMBODIMENTS

Figure 1A:
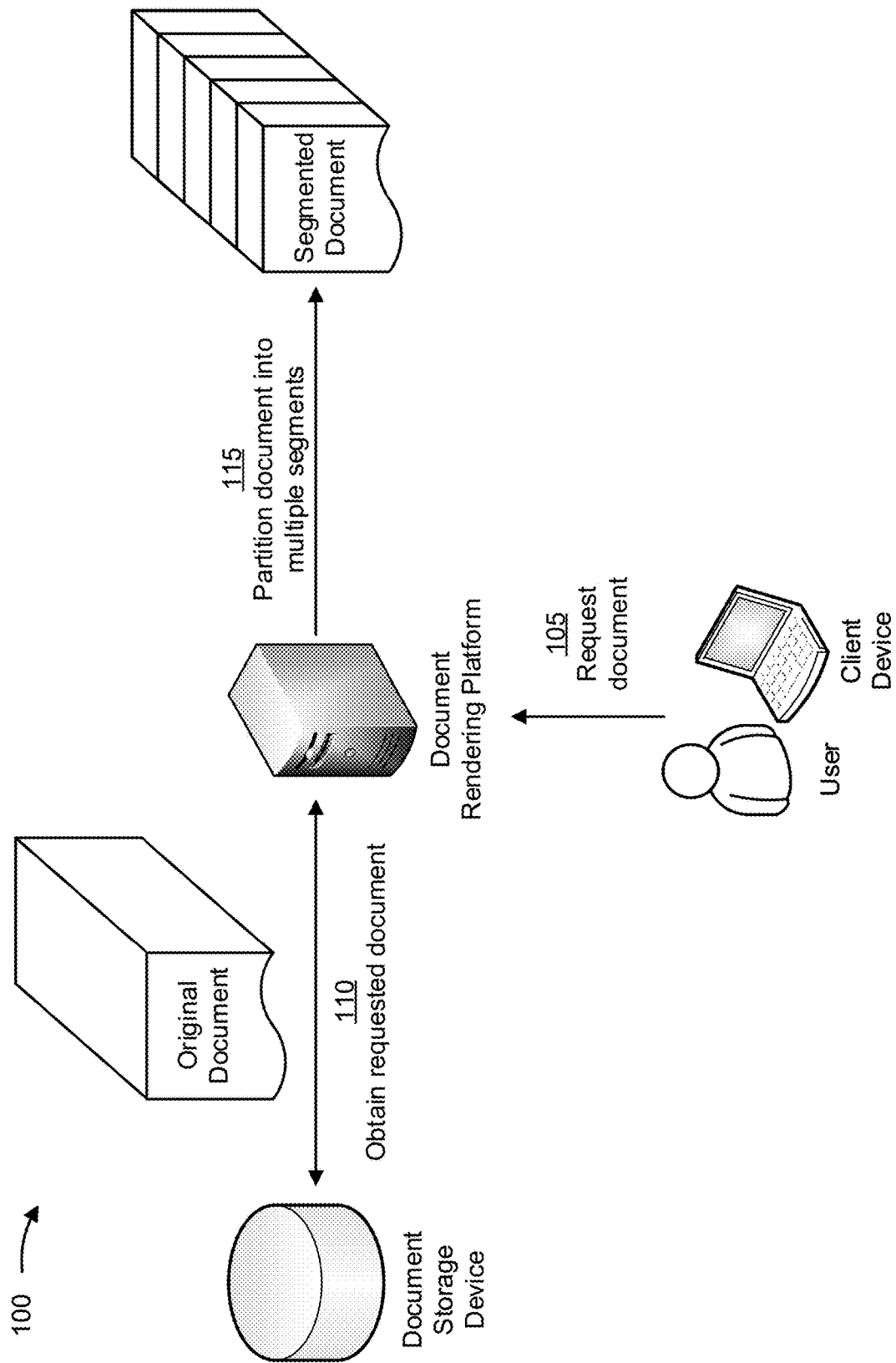
FIGS. 1A-1D are diagrams of one or more example implementations described herein.

The following detailed description of example implementations refers to the accompanying drawings. The same reference numbers in different drawings may identify the same or similar elements.

There are various contexts in which a user may have a need to view or otherwise access very large electronic documents (e.g., in terms of a quantity of pages, a file size, and/or the like). For example, some organizations may have customers (e.g., businesses, consumers, and/or the like) with very large invoices that may exceed thousands or even hundreds of thousands of pages. In other examples, certain product manuals, specifications, corporate policy documents, contracts, and/or the like may have large page counts (e.g., thousands or more), and in some cases, electronic documents may include images, dynamic content, and/or other elements that can substantially add to the data size associated with the electronic documents. When an electronic document has a very large size, significant performance problems can arise. For example, the amount of data that needs to be processed to render very large documents can easily overload conventional computing devices (e.g., can consume an excessive amount of memory, processor, and/or network resources, can cause a conventional computing device to hang or crash, and/or the like). Furthermore, the performance problems that may arise when rendering very large documents using conventional computing resources can include taking an excessive amount of time to load, display, and/or otherwise process the documents (e.g., delays due to the large file size exceeding available memory allocated to applications used to view the documents, delays due to the use of computing resources for other tasks, and/or the like).

Some implementations described herein provide a document rendering platform that can provide fast rendering, agile and seamless navigation, distributed searching, accessibility support, automatic page reorientation, support for different file formats, and/or the like when rendering very large electronic documents (e.g., electronic documents that fail to satisfy one or more memory constraints associated with a document viewer application due to having a quantity of pages, a file size, and/or the like that cannot be stored in memory allocated to the document viewer application). For example, the document rendering platform may partition a very large electronic document that fails to satisfy a memory constraint associated with the document viewer application (e.g., based on a quantity of pages, a file size, and/or the like) into multiple smaller segments that individually satisfy the memory constraint associated with the document viewer application. Accordingly, when a user of a client device requests the electronic document, the document rendering platform may return a first segment of the electronic document to be rendered to the client device. Furthermore, if necessary, the document rendering platform may convert the electronic document (or one or more segments of the electronic document) to a format that has native support in the document viewer application.

The document rendering platform may build a container (e.g., a canvas) for each page in the first segment, and the containers may be transmitted to the client device and rendered as the containers are built and populated with content. Once the first segment has been rendered in the document viewer application, the user may scroll up or down, search for specific text, navigate to a particular page number, and/or the like, and the document rendering platform may operate in one or more background processes to provide the user with a seamless experience as though the entire electronic document were loaded in the document viewer application. For example, when a current segment is loaded in the document viewer application, a configurable quantity of segments that are prior to and subsequent to the current segment may be stored in a cache associated with the document viewer application. Accordingly, when the user scrolls to a boundary of the current segment, an adjacent segment may be automatically loaded from the cache (e.g., the next segment may be loaded when the user scrolls to the end of the current segment, or the previous segment may be loaded when the user scrolls to the beginning of the current segment). Furthermore, when the user requests a page that is outside the current segment, searches for text outside the current segment, and/or the like, the client device may trigger one or more calls to the document processing platform, which may render a segment that includes the requested page, a next segment that includes the search text, and/or the like.

In this way, by rendering very large documents in individual segments, the document rendering platform conserves computing resources that would otherwise be wasted by loading the entire document at once and potentially causing the document viewer application to crash, experience substantially degraded performance (e.g., lengthy response times, hanging), and/or the like. Furthermore, because the electronic document is loaded in smaller segments, the document viewer application conserves network resources that would otherwise be wasted transferring large amounts of data over a network. Further still, by caching segments that precede and/or follow a current segment that is loaded and rendered in the document viewer application, the user can seamlessly transition between segments, and loading adjacent segments from cache may conserve network resources that would otherwise be wasted if the adjacent segments were transferred over a network prior to loading and rendering. Further, using the document rendering platform in the manner described herein conserves resources associated with an organization that would otherwise be wasted via a less efficient document rendering tool, as personnel are provided with the ability to view documents more quickly, and with less downtime, which increases productivity, efficiency, and/or the like.

For example, one organizational environment in which the document rendering platform can be used may be a call center environment, where call center representatives may respond to customers having inquiries regarding invoices, bills, and/or other documents that could exceed thousands or hundreds of thousands of pages. In such an example use case, the document rendering platform provides the call center representatives with fast and seamless access to the large documents that customers may be inquiring about, which increases efficiency by reducing an Average Handling Time (AHT) to resolve a customer inquiry, conserves computing resources (e.g., processor resources, memory resources, communication resources, and/or the like) that would otherwise be wasted during longer, inefficient communication sessions between the call center representatives and the customers, and/or the like.

FIGS. 1A-1D are diagrams of one or more example implementations 100 described herein. As will be described in further detail herein, example implementation(s) 100 may include a client device that may be operated by a user, a document storage device that may store one or more electronic documents (including very large electronic documents that may have a quantity of pages, a file size, and/or the like that exceed constraints associated with a document viewer application executing on the client device), and a document rendering platform that may process very large electronic documents to enable high-performance (e.g., fast, agile, seamless) viewing, searching, navigation, and/or the like at the client device.

Figure 1B:
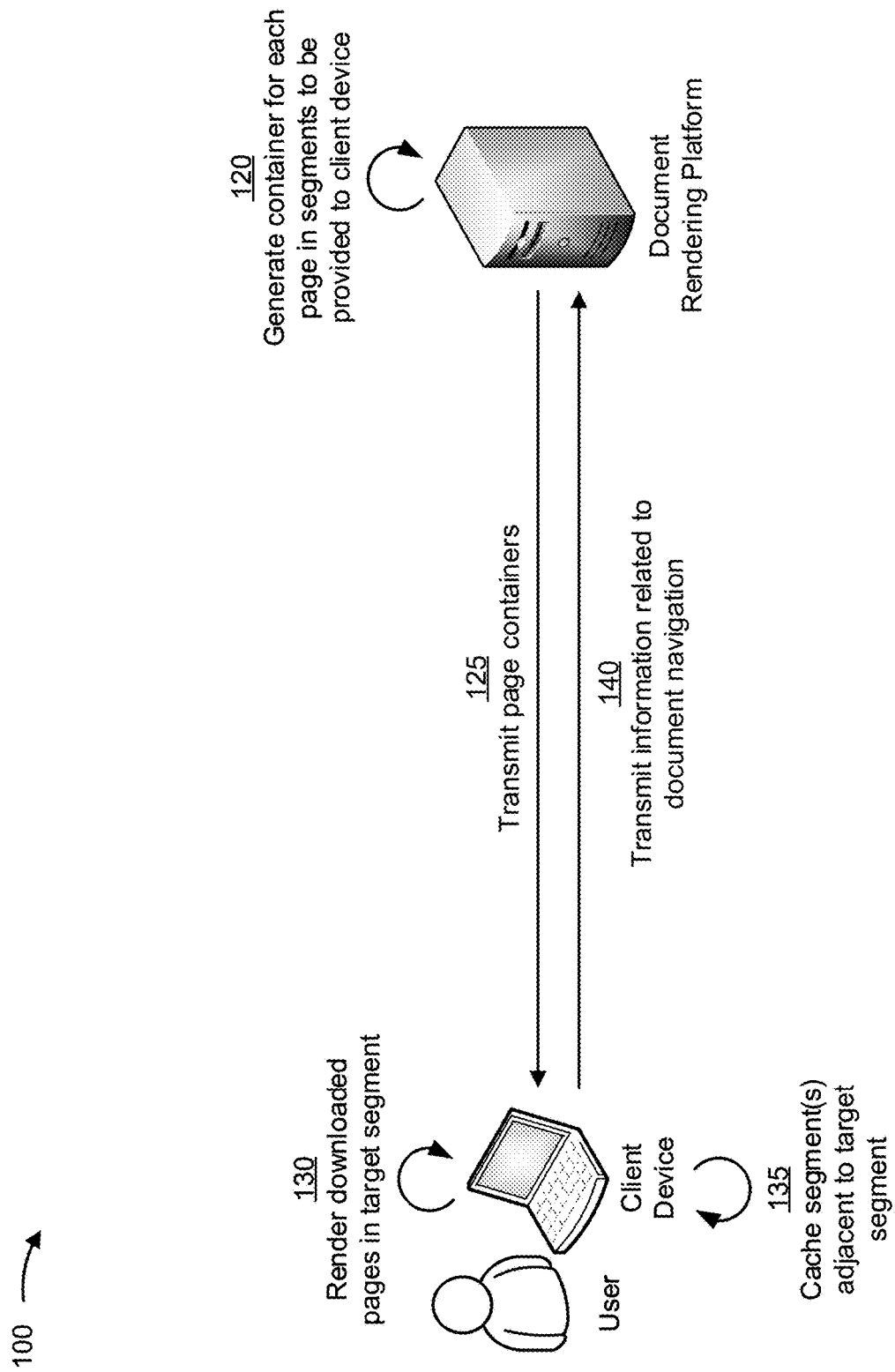
Figure 1C:
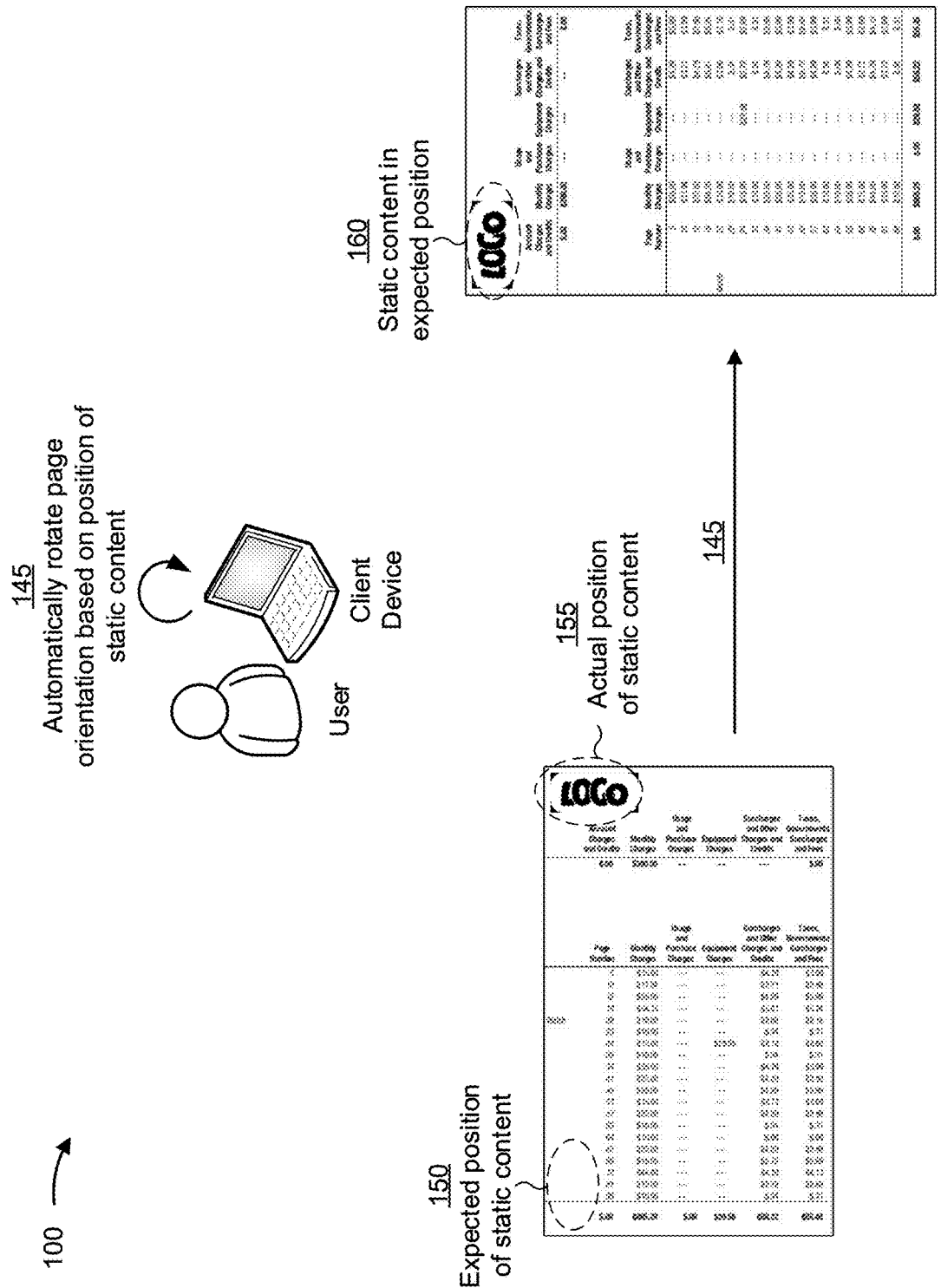
Figure 1D:
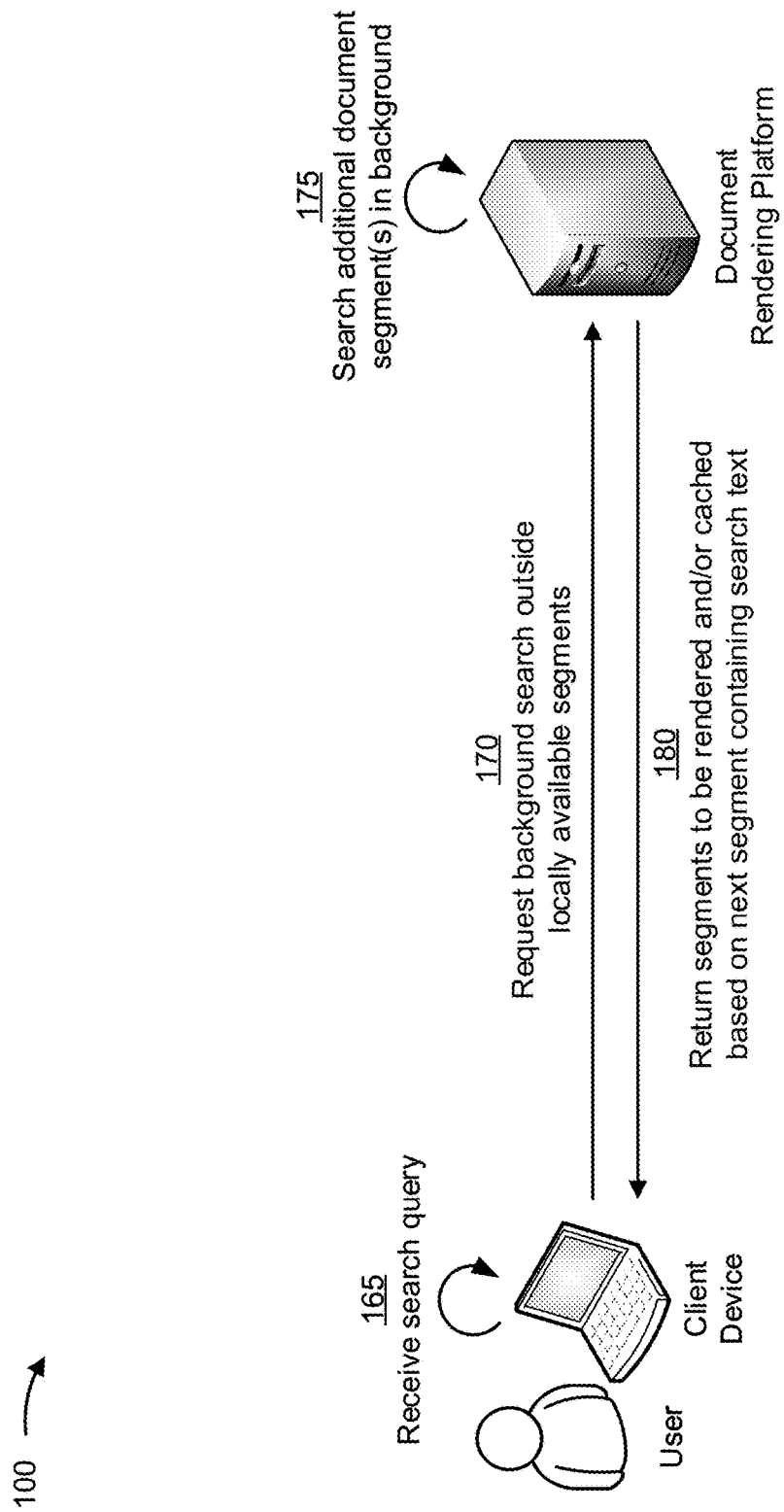

For example, as shown in FIG. 1A, the user operating the client device may submit a request for an electronic document to the document rendering platform, which may obtain the electronic document from the document storage device and partition the electronic document into multiple segments. As shown in FIG. 1B, the document rendering platform may generate a container for each page in one or more segments to be rendered and/or cached by the client device, and the containers may be transmitted to the client device for rendering and/or caching. As further shown in FIG. 1B, the client device may transmit information related to navigation within the electronic document to the document rendering platform, which may dynamically generate containers for pages in other segments to be rendered and/or cached as-needed based on the information related to the navigation within the electronic document. As shown in FIG. 1C, the client device may execute a document viewer application to render pages in the segments provided by the document rendering platform, and the document viewer application may support user interface functionality to enhance readability, efficiency, and/or the like (e.g., automatically rotating pages between portrait and landscape modes based on a position and/or orientation of one or more static content elements). As shown in FIG. 1D, the document rendering platform may also support distributed searching, performing one or more searches in a background process and returning segments that contain search text to the client device.

As shown in FIG. 1A, and by reference number 105, the user operating the client device may transmit, to the document rendering platform, a request for a particular electronic document. The client device may execute a document viewer application that provides a front-end interface to enable the user to interact with the document rendering platform. For example, in some implementations, the document viewer application may be a web browser that has native support to render electronic documents having various file formats (e.g., HyperText Markup Language (HTML), Portable Document Format (PDF), and/or the like), and the web browser may provide an interface that enables the user to access the document rendering platform and specify one or more criteria for the electronic document being requested. For example, the user may search for an electronic document associated with a particular identifier (e.g., an account number, a mobile telephone number, a name, and/or the like), a particular date range, and/or the like. The document rendering platform may communicate with the document storage device to identify a set of electronic documents that match the criteria provided by the user and populate the interface to enable the user to select a particular electronic document to be requested. Additionally, or alternatively, the document rendering platform may include one or more data structures that index information associated with the electronic documents stored in the document storage device, and the indexed information may be used to identify the set of electronic documents that match the criteria provided by the user.

As further shown in FIG. 1A, and by reference number 110, the document rendering platform may obtain the electronic document from the document storage device. In some cases, the electronic document obtained from the document storage device may have a file format that lacks native support in the document viewer application, and the document rendering platform may convert at least a portion of the electronic document to another format that has native support in the document viewer application. For example, large organizations often deploy document rendering architectures based on the Advanced Function Presentation (AFP) file format and/or file formats that require specialized plug-ins, viewers, fonts, icons, and/or the like to render documents. Accordingly, in some implementations, the document rendering platform may automatically convert electronic documents that are associated with file formats that do not have native support in the document viewer application to more common, universal file formats that have native support in the document viewer application (e.g., HTML, PDF, XML, and/or the like). For example, in some implementations, the document rendering platform may convert the entire electronic document to the format that has native support in the document viewer application. Alternatively, in some implementations, the document rendering platform may convert only one or more segments of the electronic document to be provided to the client device (e.g., to conserve computing resources that would otherwise be consumed converting segments of the electronic document that the client device may not need to access).

In this way, the document rendering platform provides an ability to support any document format and enables the document viewer application to be implemented in conjunction with standard applications, such as web browsers. Furthermore, by ensuring that the electronic document is made available in a format that has native support in the document viewer application, the document rendering platform eliminates a need to install specialized software on the client device to support different file formats, which conserves computing resources that would otherwise be wasted deploying the specialized software, running and maintaining the specialized software, deploying infrastructure to support different file formats, and/or the like.

Furthermore, making the electronic document available to render in a format that has native support in the document viewer application may enable various accessibility features, such as enabling support for a screen reader application (e.g., Job Access With Speech (JAWS)) to present content rendered on a display to a visually impaired user using text-to-speech output, a refreshable Braille display, and/or the like. For example, the electronic document may be presented for rendering in a format that associates text with one or more accessibility elements (e.g., tags, coded elements, and/or the like), whereby the screen reader application may identify the one or more accessibility elements within the electronic document and use the one or more accessibility elements to locate and present the associated text to the visually impaired user.

As further shown in FIG. 1A, and by reference number 115, the document rendering platform may partition the electronic document obtained from the document storage device into multiple segments. In particular, as shown in FIG. 1A, the original electronic document obtained from the document storage device may have a size that fails to satisfy one or more memory constraints associated with the document viewer application executing on the client device. For example, a finite amount of memory may be allocated to the document viewer application, and the original electronic document may have a quantity of pages, a file size, and/or the like that exceeds an amount of data that can be stored in the memory allocated to the document viewer application and thus cause the document viewer application to crash, hang, or otherwise experience degraded performance. Additionally, or alternatively, the original electronic document may have a size that would cause degraded performance by consuming a disproportionate amount of the memory allocated to the document viewer application. In some implementations, the document rendering platform may communicate with the client device to determine the memory constraints associated with the document viewer application (e.g., to determine an amount of memory allocated to the document viewer application, a proportion of the allocated memory that is free and available to use, and/or the like). Additionally, or alternatively, the document rendering platform may be configured with one or more data structures to store information related to memory constraints with the client device and refer to the one or more data structures to determine whether the original electronic document has a size that fails to satisfy the memory constraint(s) associated with the document viewer application.

Accordingly, the document rendering platform may partition the original electronic document into multiple segments that individually satisfy the one or more memory constraints associated with the document viewer application, whereby some (but not all) of the multiple segments can be rendered and/or cached by the client device without degraded performance. For example, in some implementations, the original electronic document may be partitioned into multiple segments that have an equal or roughly equal number of pages (e.g., an electronic document with 100,000 pages may be partitioned into 1000 segments that each have 100 pages). Additionally, or alternatively, the original electronic document may be partitioned into multiple segments that have an equal or roughly equal file size (e.g., an electronic document with a 1 GB file size may be partitioned into 1000 segments that each have a 1 MB file size). Additionally, or alternatively, a size of the multiple partitions (e.g., in terms of quantity of pages, file size, and/or the like) may be configured based on the memory constraints associated with the document viewer application. For example, a quantity of pages, a file size, and/or the like for each segment may be defined to ensure that the individual segment can be loaded and rendered without causing degraded performance at the client device. In this way, the electronic document may be partitioned to ensure that individual segments can be loaded into the memory allocated to the document viewer application without causing the document viewer application to hang, crash, experience delays, and/or the like. Furthermore, in cases where the electronic document is partitioned based on file size, the document rendering platform may account for intra-document variations whereby some pages may have higher memory requirements than others (e.g., due to the presence of images, embedded content, annotations, formatting, and/or the like).

As shown in FIG. 1B, and by reference number 120, the document rendering platform may generate a container for each page in a set of segments to be provided to the client device. For example, the container may be a canvas or computer file (e.g., a metafile) that can store one or more data types (e.g., text, graphics files, and/or the like) and provide a structure to describe or otherwise represent a relationship among data elements and related metadata. In some implementations, the set of segments to be provided to the client device may include a first (initial) segment of the electronic document and/or a particular segment that includes a page that the user has requested (e.g., assuming that segments have 100 pages each and the user requests to view page 176, the set of segments to be provided to the client device may include a second segment of the electronic document, encompassing pages 101 through 200).

Furthermore, relative to a segment to be rendered by the client device, the set of segments to be provided to the client device may include a configurable quantity of previous and next segments within the electronic document. For example, the set of segments provided to the client device may include M segments that immediately precede the segment to be rendered and N segments that immediately follow the segment to be rendered, where M and N may have the same value or different values. In some cases, the value(s) for M and/or N may be dependent on behavior of the user while interacting with or otherwise navigating the electronic document (e.g., if the user is scrolling in a particular direction, more segments may be provided in the direction that the user is scrolling based on a higher probability that the user will continue to scroll in the same direction). In another example, where the segment to be rendered is a first segment in the electronic document, the set of segments provided to the client device may include only the N segments that immediately follow the segment to be rendered, as there would not be any segments that precede the segment to be rendered, and the converse approach may be taken when the segment to be rendered is a last segment in the electronic document.

As further shown in FIG. 1B, and by reference number 125, the document rendering platform may transmit the containers for the pages to the client device as the containers are generated and populated with content from the electronic document. In some implementations, the container for each page transmitted to the client device may be appended to the container for the previous page. In this way, as pages are downloaded and prepared for rendering by the client device, the document rendering platform may continue to transmit containers for additional pages and the client device may continue to download the containers for the additional pages in the background. In this way, at least some pages in a segment may be received and made available to render at the client device while the client device continues to download other pages in the segment as the other pages become available.

As further shown in FIG. 1B, and by reference number 130, the client device may render one or more pages that have been downloaded for a target segment (e.g., a first segment of the electronic document, a segment containing a particular page requested by the user, and/or the like). For example, the client device may load the pages of the target segment into the memory allocated to the document viewer application as the corresponding containers are transmitted by the document rendering platform and downloaded to the client device. The document viewer application may then cause one or more pages to be rendered for presentation to the user of the client device. For example, rendering the one or more pages may include reading the contents of the corresponding container(s) and displaying the contents on a screen of the client device. Additionally, or alternatively, rendering the one or more pages may include using a screen reader application to present the contents of the corresponding container(s) in a form that can be perceived by a visually impaired user (e.g., as audio using text-to-speech output, via a refreshable Braille display, and/or the like).

As further shown in FIG. 1B, and by reference number 135, the client device may cache one or more segments of the electronic document that are adjacent to the target segment being rendered. As mentioned above, the segments that are adjacent to the target segment may include M segments that immediately precede the target segment and N segments that immediately follow the target segment, where M and N may have the same value or different values, and where M and N may be greater than or equal to zero.

In some implementations, the client device may store the segments that are adjacent to the target segment in a cache associated with the document viewer application (e.g., a browser cache), and the one or more segments to be cached may be provided by the document rendering platform in a substantially similar manner as the target segment to be rendered. In this way, the client device may quickly render the cached segments as the user scrolls through or otherwise navigates the electronic document, which may provide a seamless experience as though the entire electronic document were loaded. For example, as the user of the client device navigates to a boundary of the target segment, the next segment or the previous segment may be automatically loaded from the cache (depending on the direction in which the user is scrolling). Furthermore, in some implementations, a quantity and/or size of the segments to be stored in the cache associated with the document viewer application may depend on a capacity of the cache. Accordingly, the document rendering platform may obtain information related to a state of the cache (e.g., a total capacity of the cache, an unused capacity of the cache, and/or the like) from the client device, a data structure, and/or another suitable source, and the information related to the state of the cache may be used to determine the quantity and/or size of the segments to be provided to the client device for storage in the cache.

As further shown in FIG. 1B, and by reference number 140, the client device may transmit, to the document rendering platform, information that relates to behavior of the user in navigating the electronic document. For example, if the user scrolls to or past the boundary of the current segment being rendered, the document rendering platform may generate containers for the pages in the next segment and transmit the containers to the client device to update the segments stored in the cache. In this way, the client device may consistently have a contiguous group of segments loaded into the memory of the document viewer application and available for fast rendering. Furthermore, if the user jumps to a particular page that is outside the group of segments loaded into the memory of the document viewer application, this information may be conveyed to the document rendering platform, which may provide the client device with the segment containing the particular page along with the M segments that immediately precede the segment containing the particular page and the N segments that immediately follow the segment containing the particular page. In some cases, the segments that are stored in the cache may additionally, or alternatively, include the previous segment that was rendered by the client device (e.g., to account for behavior patterns whereby users do not always scroll through a document sequentially, and instead return to a previous location in the electronic document).

As shown in FIG. 1C, and by reference number 145, the document viewer application may further include functionality to automatically rotate pages that are rendered on the client device between a portrait mode and a landscape mode based on a position and/or orientation of one or more static content elements. For example, corporate logos, icons, and/or other static content elements may have an expected position and/or orientation on a page, and the document viewer application may be configured to locate the static content elements on the rendered page and reorient the rendered page when the static content elements are not in the expected position and/or orientation. For example, as further shown in FIG. 1C, and by reference number 150, static content such as a corporate logo may have an expected position in an upper-left corner of an electronic document such as an invoice, a product manual, and/or the like. However, as further shown in FIG. 1C, and by reference number 155, the static content has an actual position in an upper-right corner of the electronic document, and thus the static content is rotated clockwise 90 degrees relative to the expected orientation of the static content. Accordingly, as further shown in FIG. 1C, and by reference number 160, the document viewer application may rotate the page in a manner that causes the static content to be located in the expected position and/or orientation. More particularly, in the illustrated example, the page has been rotated counter-clockwise 90 degrees. In this way, the text on the page is rotated to be in an optimal reading position, thus improving efficiency of the user viewing the electronic document. Furthermore, when used in a context such as a call center, improving the efficiency of the user can result in a reduced Average Handling Time (AHT), which conserves computing resources (e.g., processor resources, memory resources, communication resources, and/or the like) consumed to handle customer inquiries.

As shown in FIG. 1D, and by reference number 165, the client device may receive a search query including search text specified by the user. In some implementations, the client device may initially search the locally available segments of the electronic document, including the current segment rendered on the client device and/or the segments stored in the cache associated with the document viewer application. In some cases, distributed searching whereby the document rendering platform performs a background search may be triggered when the search text does not appear in the locally available segments, when the user wants to continue a search in other segments that are not locally available, and/or the like.

Accordingly, as further shown in FIG. 1D, and by reference number 170, the client device may transmit, to the document rendering platform, a request to perform a background search outside the locally available segments. In some cases, prior to performing the background search, the document rendering platform may provide the user of the client device with different options regarding how the search is to be performed. For example, the document rendering platform may prompt the user to choose whether to search only the next segment of the electronic document, search all segments of the electronic document until the search text is found, search all segments of the electronic document to find all instances of the search text, and/or the like. In the former case, searching only the next segment may consume less computing resources compared to searching all segments, although limiting the search to the next segment only may be less likely to result in a hit. In the latter case, searching all segments to find all instances of the search text may consume more computing resources and take substantial time (especially when the electronic document includes thousands or more pages), although the broader search may be more likely to result in the user finding relevant information. Accordingly, searching all segments of the electronic document until the search text is found may provide a balance between conserving computing resources and maximizing a likelihood of finding at least one hit without the user having to repeatedly request to continue the search if the search text is not found in the next individual segment.

As further shown in FIG. 1D, and by reference number 175, the document rendering platform may search additional segments of the electronic document in the background based on the particular option chosen by the user. As further shown in FIG. 1D, and by reference number 180, the document rendering platform may return, to the client device, a set of segments to be rendered and/or cached based on the next segment that contains the search text (assuming that the search text is found). In particular, the document rendering platform may generate containers for the pages in the segment that contains the search text and a set of segments in the electronic document that surround the segment that contains the search text in a similar manner as described elsewhere herein. Furthermore, in the case where the user has requested to search all segments of the electronic document to find all instances of the search text, the document rendering platform may continue the search in the background while segments are returned to the client device. In this way, if the client device requests a next search result outside the set of locally available segments, the document rendering platform may have already determined the next segment containing the search text, which reduces response time for returning the next set of segments associated with the search.

As indicated above, FIGS. 1A-1D are provided as one or more examples. Other examples may differ from what is described with regard to FIGS. 1A-1D.

Figure 2:
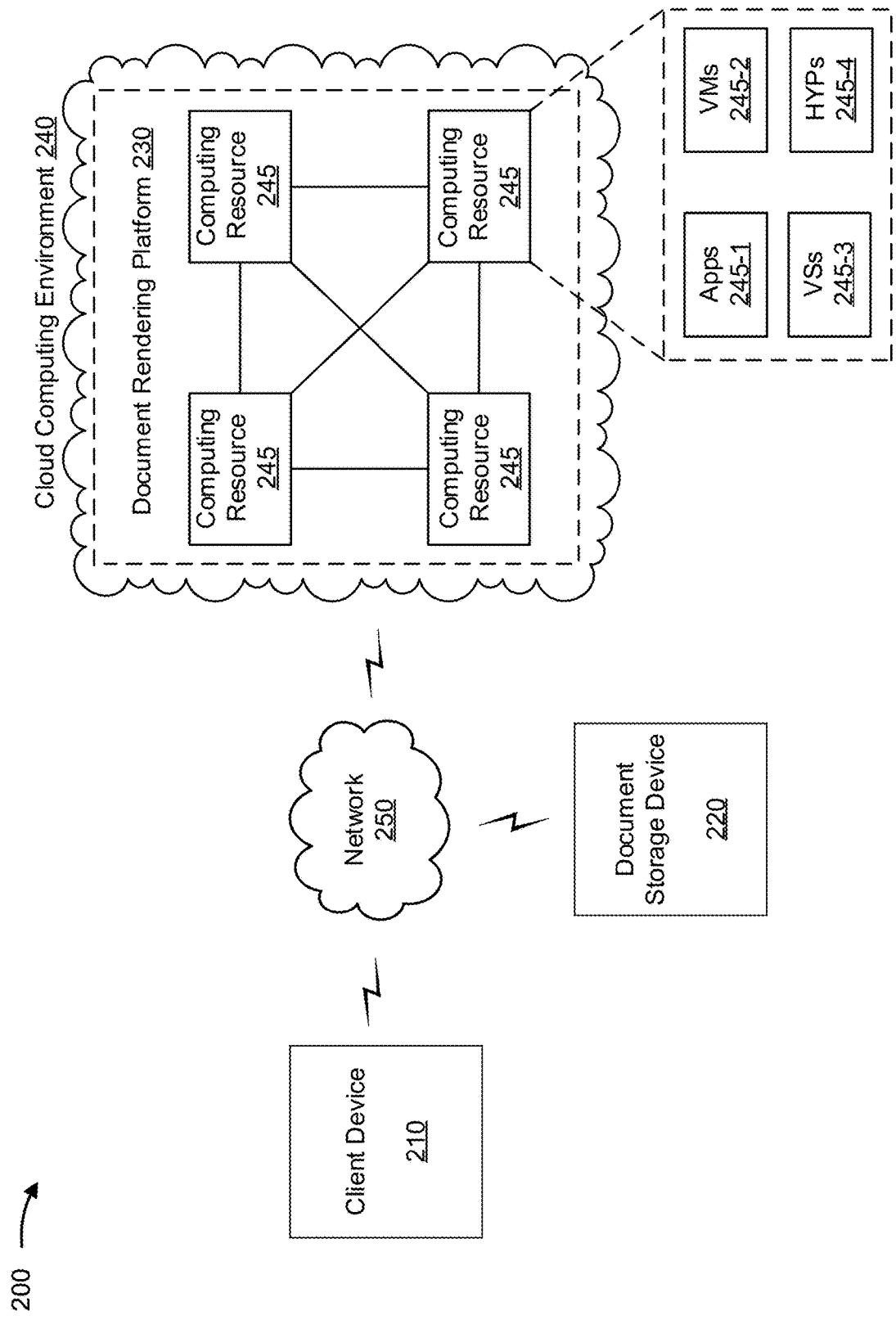
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a document storage device 220, a document rendering platform 230 hosted within a cloud computing environment 240 that includes a set of computing resources 245, and a network 250. Devices of environment 200 may interconnect via wired connections, wireless connections, or a combination of wired and wireless connections.

Client device 210 includes one or more devices capable of receiving, generating, storing, processing, analyzing, and/or providing information associated with rendering very large electronic documents. For example, client device 210 can include a computer (e.g., a desktop computer, a laptop computer, a tablet computer, a handheld computer, a server device, and/or the like), a mobile phone (e.g., a smart phone, a radiotelephone, and/or the like), an internet of things (IoT) device or smart appliance, a personal navigation device, or a similar device. In some implementations, client device 210 can receive information from and/or transmit information to document storage device 220, document rendering platform 230, and/or the like. For example, client device 210 can transmit a request for an electronic document to document rendering platform 230, which may obtain the electronic document from document storage device 220. Furthermore, client device 210 may receive information related to a current segment of the electronic document to be rendered by client device 210 and information related to a set of additional segments of the electronic document to be cached by client device 210, and the current segment and the set of additional segments may have a collective size that satisfies one or more memory constraints associated with a document viewer application executing on client device 210. Accordingly, client device 210 may render a first set of pages in the current segment of the electronic document using the document viewer application and store the set of additional segments in a cache associated with the document viewer application.

Document storage device 220 includes one or more devices capable of receiving, storing, processing, and/or providing information related to electronic documents. For example, in some implementations, document storage device 220 can include a server device, a hard disk device, an optical disk device, a solid-state drive (SSD), a compact disc (CD), a network attached storage (NAS) device, a Flash memory device, a cartridge, a magnetic tape, and/or another device that can store and provide access to electronic documents. In some implementations, document storage device 220 can include a communication interface that allows document storage device 220 to receive information from and/or transmit information to other devices in environment 200, such as client device 210 and/or document rendering platform 230.

Document rendering platform 230 includes one or more devices capable of receiving, generating, storing, processing, and/or providing information associated with rendering very large electronic documents (e.g., electronic documents that fail to satisfy one or more memory constraints associated with a document viewer application executing on client device 210). For example, in some implementations, document rendering platform 230 may obtain an electronic document from document storage device 220 based on a request from client device 210 and partition the electronic document into multiple segments that individually satisfy a memory constraint associated with a document viewer application executing on client device 210. Document rendering platform 230 may transmit, to client device 210, information related to a current segment of the electronic document to be rendered by client device 210 and a first set of additional segments of the electronic document to be cached by client device 210, and the current segment and the first set of additional segments may collectively satisfy the memory constraint associated with the document viewer application executing on client device 210.

In some implementations, as shown, document rendering platform 230 can be hosted in a cloud computing environment 240. Notably, while implementations described herein describe document rendering platform 230 as being hosted in cloud computing environment 240, in some implementations, document rendering platform 230 can be non-cloudbased (e.g., can be implemented outside of a cloud computing environment) or partially cloud-based.

Cloud computing environment 240 includes an environment that hosts document rendering platform 230. Cloud computing environment 240 can provide computation, software, data access, storage, and/or other services that do not require end-user knowledge of a physical location and configuration of system(s) and/or device(s) that host document rendering platform 230. As shown, cloud computing environment 240 can include a group of computing resources 245 (referred to collectively as "computing resources 245" and individually as "computing resource 245").

Computing resource 245 includes one or more personal computers, workstation computers, server devices, or other types of computation and/or communication devices. In some implementations, computing resource 245 can host document rendering platform 230. The cloud resources can include compute instances executing in computing resource 245, storage devices provided in computing resource 245, data transfer devices provided by computing resource 245, and/or the like. In some implementations, computing resource 245 can communicate with other computing resources 245 via wired connections, wireless connections, or a combination of wired and wireless connections.

As further shown in FIG. 2, computing resource 245 includes a group of cloud resources, such as one or more applications ("APPs") 245-1, one or more virtual machines ("VMs") 245-2, virtualized storage ("VSs") 245-3, one or more hypervisors ("HYPs") 245-4, and/or the like.

Application 245-1 includes one or more software applications that can be provided to or accessed by client device 210, document storage device 220, and/or the like. Application 245-1 can eliminate a need to install and execute the software applications on client device 210, document storage device 220, and/or the like. For example, application 245-1 can include software associated with document rendering platform 230 and/or any other software capable of being provided via cloud computing environment 240. In some implementations, one application 245-1 can send information to and/or receive information from one or more other applications 245-1, via virtual machine 245-2.

Virtual machine 245-2 includes a software implementation of a machine (e.g., a computer) that executes programs like a physical machine. Virtual machine 245-2 can be either a system virtual machine or a process virtual machine, depending upon use and degree of correspondence to any real machine by virtual machine 245-2. A system virtual machine can provide a complete system platform that supports execution of a complete operating system ("OS"). A process virtual machine can execute a single program, and can support a single process. In some implementations, virtual machine 245-2 can execute on behalf of a user (e.g., a user of client device 210, document storage device 220, and/or the like), and can manage infrastructure of cloud computing environment 240, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can provide administrators of the storage system with flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 245-4 can provide hardware virtualization techniques that allow multiple operating systems (e.g., "guest operating systems") to execute concurrently on a host computer, such as computing resource 245. Hypervisor 245-4 can present a virtual operating platform to the guest operating systems, and can manage the execution of the guest operating systems. Multiple instances of a variety of operating systems can share virtualized hardware resources.

Network 250 includes one or more wired and/or wireless networks. For example, network 250 can include a cellular network (e.g., a long-term evolution (LTE) network, a code division multiple access (CDMA) network, a 3G network, a 4G network, a 5G network, another type of next generation network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a core network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
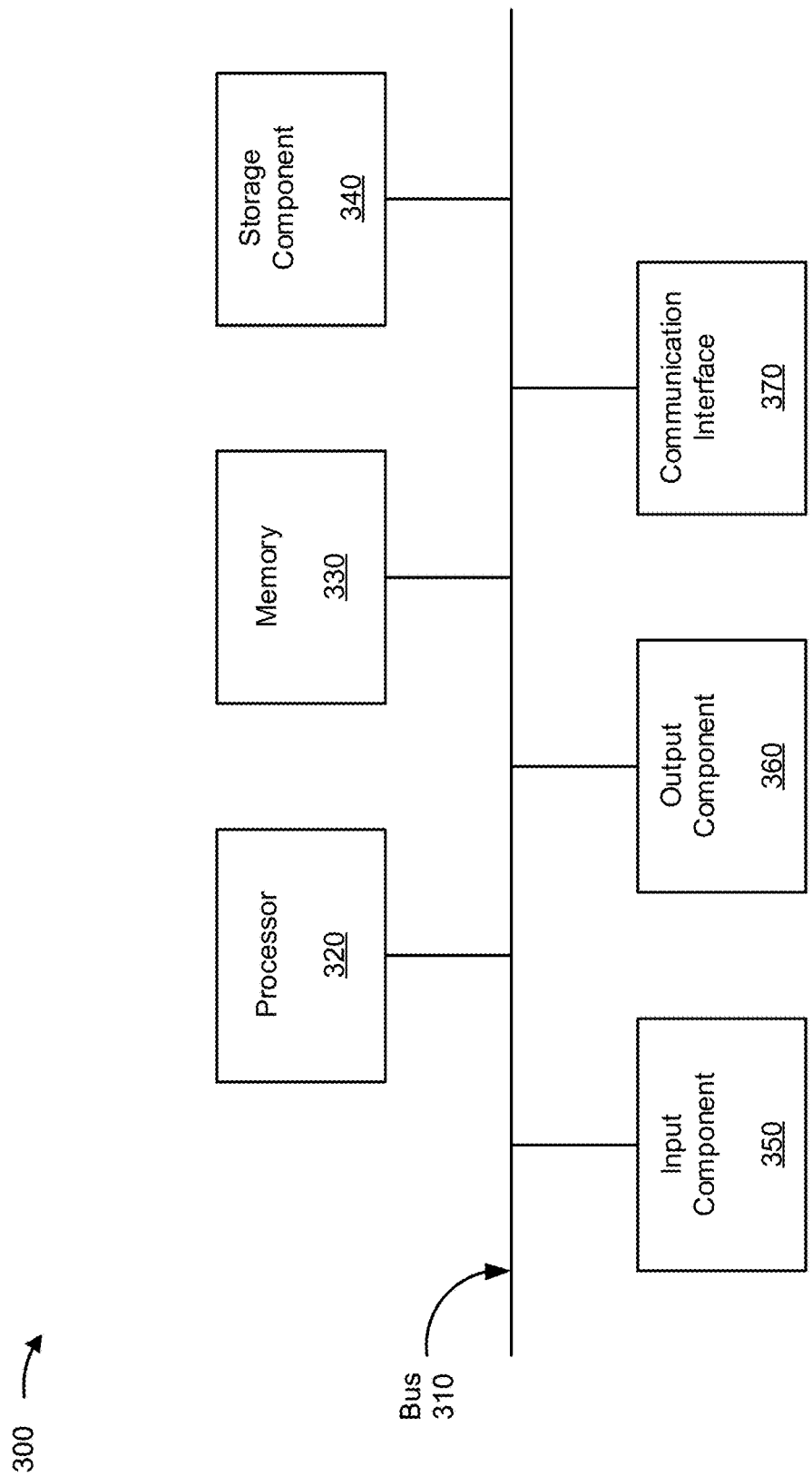
FIG. 3 is a diagram of example components of one or more devices of FIG. 2.

FIG. 3 is a diagram of example components of a device 300. Device 300 may correspond to client device 210, document storage device 220, document rendering platform 230, computing resource 245, and/or the like. In some implementations, client device 210, document storage device 220, document rendering platform 230, and/or computing resource 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
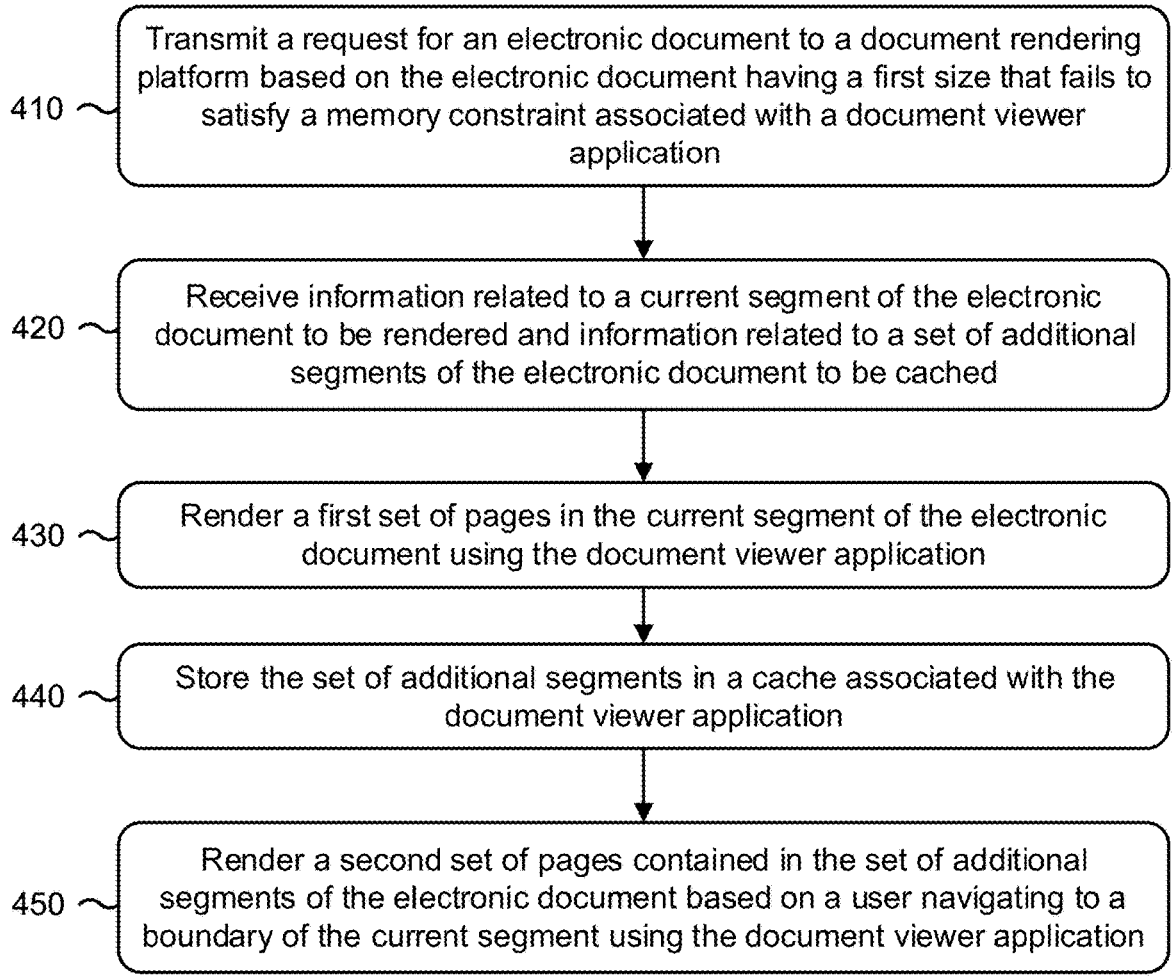
FIGS. 4-6 are flow charts of example processes for dynamically rendering very large multi-format documents.

FIG. 4 is a flow chart of an example process 400 for dynamically rendering very large multi-format documents. In some implementations, one or more process blocks of FIG. 4 may be performed by a client device (e.g., client device 210). In some implementations, one or more process blocks of FIG. 4 may be performed by another device or a group of devices separate from or including the client device, such as a document storage device (e.g., document storage device 220), a document rendering platform (e.g., document rendering platform 230), and/or the like.

As shown in FIG. 4, process 400 may include transmitting a request for an electronic document to a document rendering platform based on the electronic document having a first size that fails to satisfy a memory constraint associated with a document viewer application (block 410). For example, the client device (e.g., using processor 320, memory 330, storage component 340, input component 350, output component 360, communication interface 370, and/or the like) may transmit a request for an electronic document to a document rendering platform based on the electronic document having a first size that fails to satisfy a memory constraint associated with a document viewer application, as described above.

As further shown in FIG. 4, process 400 may include receiving information related to a current segment of the electronic document to be rendered and information related to a set of additional segments of the electronic document to be cached (block 420). For example, the client device (e.g., using processor 320, memory 330, storage component 340, input component 350, output component 360, communication interface 370, and/or the like) may receive information related to a current segment of the electronic document to be rendered and information related to a set of additional segments of the electronic document to be cached, as described above. In some implementations, the current segment and the set of additional segments may collectively have a second size that satisfies the memory constraint associated with the document viewer application.

As further shown in FIG. 4, process 400 may include rendering a first set of pages in the current segment of the electronic document using the document viewer application (block 430). For example, the client device (e.g., using processor 320, memory 330, storage component 340, input component 350, output component 360, communication interface 370, and/or the like) may render a first set of pages in the current segment of the electronic document using the document viewer application, as described above.

As further shown in FIG. 4, process 400 may include storing the set of additional segments in a cache associated with the document viewer application (block 440). For example, the client device (e.g., using processor 320, memory 330, storage component 340, input component 350, output component 360, communication interface 370, and/or the like) may store the set of additional segments in a cache associated with the document viewer application, as described above.

As further shown in FIG. 4, process 400 may include rendering a second set of pages contained in the set of additional segments of the electronic document based on a user navigating to a boundary of the current segment using the document viewer application (block 450). For example, the client device (e.g., using processor 320, memory 330, storage component 340, input component 350, output component 360, communication interface 370, and/or the like) may render a second set of pages contained in the set of additional segments of the electronic document based on a user navigating to a boundary of the current segment using the document viewer application, as described above.

Process 400 may include additional implementations, such as any single implementation or any combination of implementations described below and/or in connection with one or more other processes described elsewhere herein.

In a first implementation, the set of additional segments may include one or more sets of segments of the electronic document that are adjacent to the current segment within the electronic document.

In a second implementation, alone or in combination with the first implementation, the set of additional segments may include one or more previously rendered segments of the electronic document.

In a third implementation, alone or in combination with one or more of the first and second implementations, rendering one or more of the first set of pages or the second set of pages may include rendering a particular page that includes one or more static content elements, and automatically adjusting an orientation of the particular page based on a position of the one or more static content elements on the particular page.

In a fourth implementation, alone or in combination with one or more of the first through third implementations, the request for the electronic document may cause the document rendering platform to partition the electronic document into multiple segments that individually satisfy the memory constraint associated with the document viewer application.

In a fifth implementation, alone or in combination with one or more of the first through fourth implementations, the document viewer application may be a web browser, and the request for the electronic document may cause the document rendering platform to convert the electronic document from a first format that lacks native support in the web browser to a second format that has native support in the web browser.

In a sixth implementation, alone or in combination with one or more of the first through fifth implementations, the client device may identify, in one or more of the first set of pages or the second set of pages, one or more accessibility elements that contain readable text. In some implementations, the client device may use a screen reader application to generate audio corresponding to the readable text contained in the one or more accessibility elements.

In a seventh implementation, alone or in combination with one or more of the first through sixth implementations, the client device may transmit, to the document rendering platform, a request to search the electronic document for a search string. In some implementations, the client device may receive information related to a next segment of the electronic document to be rendered based on the document rendering platform finding the search string in the next segment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
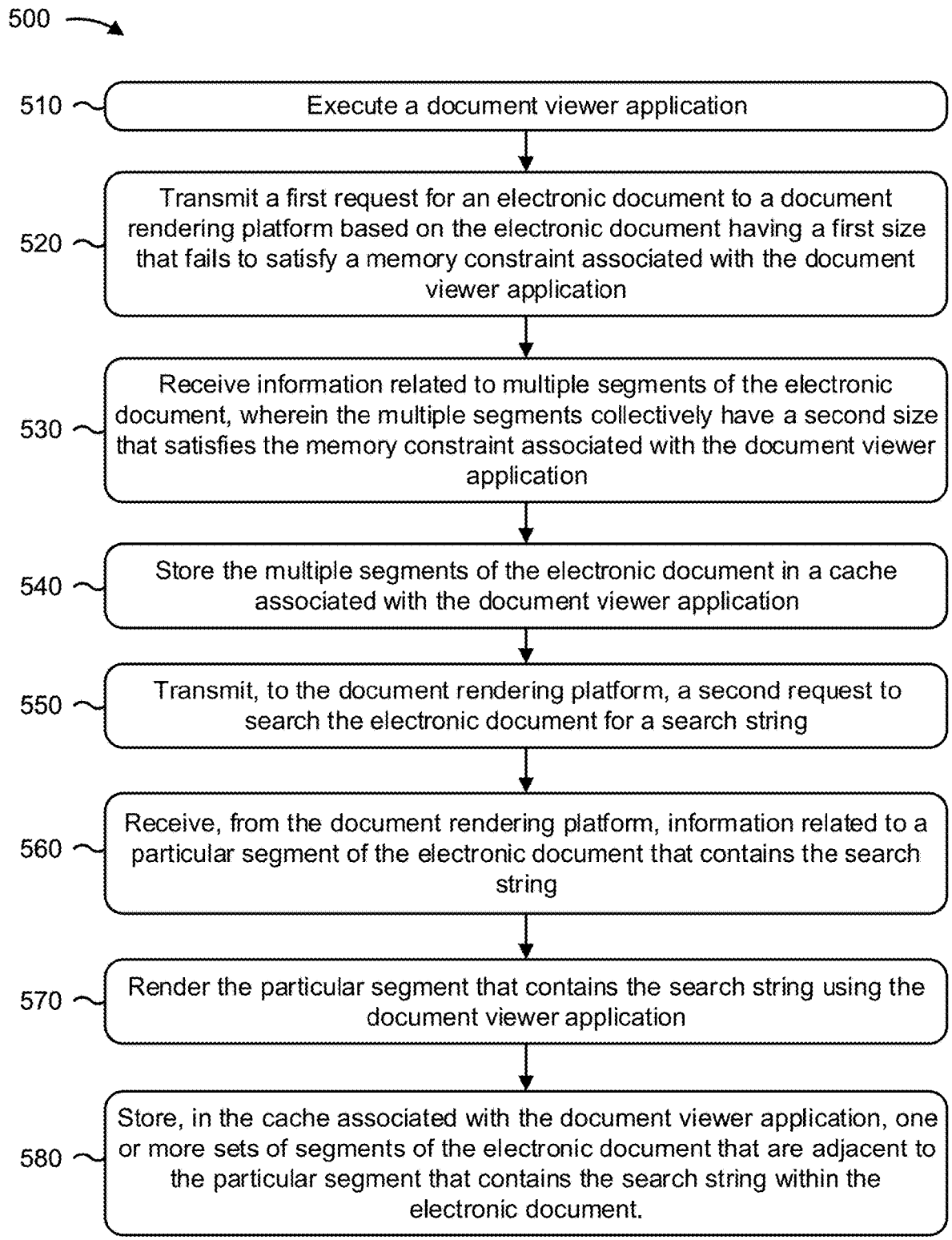

FIG. 5 is a flow chart of an example process 500 for dynamically rendering very large multi-format documents. In some implementations, one or more process blocks of FIG. 5 may be performed by a client device (e.g., client device 210). In some implementations, one or more process blocks of FIG. 4 may be performed by another device or a group of devices separate from or including the client device, such as a document storage device (e.g., document storage device 220), a document rendering platform (e.g., document rendering platform 230), and/or the like.

As shown in FIG. 5, process 500 may include executing a document viewer application (block 510). For example, the client device (e.g., using processor 320, memory 330, storage component 340, input component 350, output component 360, communication interface 370 and/or the like) may execute a document viewer application, as described above.

As further shown in FIG. 5, process 500 may include transmitting a first request for an electronic document to a document rendering platform based on the electronic document having a first size that fails to satisfy a memory constraint associated with the document viewer application (block 520). For example, the client device (e.g., using processor 320, memory 330, storage component 340, input component 350, output component 360, communication interface 370, and/or the like) may transmit a first request for an electronic document to a document rendering platform based on the electronic document having a first size that fails to satisfy a memory constraint associated with the document viewer application, as described above.

As further shown in FIG. 5, process 500 may include receiving information related to multiple segments of the electronic document, wherein the multiple segments may collectively have a second size that satisfies the memory constraint associated with the document viewer application (block 530). For example, the client device (e.g., using processor 320, memory 330, storage component 340, input component 350, output component 360, communication interface 370, and/or the like) may receive information related to multiple segments of the electronic document, as described above. In some implementations, the multiple segments may collectively have a second size that satisfies the memory constraint associated with the document viewer application.

As further shown in FIG. 5, process 500 may include storing the multiple segments of the electronic document in a cache associated with the document viewer application (block 540). For example, the client device (e.g., using processor 320, memory 330, storage component 340, input component 350, output component 360, communication interface 370, and/or the like) may store the multiple segments of the electronic document in a cache associated with the document viewer application, as described above.

As further shown in FIG. 5, process 500 may include transmitting, to the document rendering platform, a second request to search the electronic document for a search string (block 550). For example, the client device (e.g., using processor 320, memory 330, storage component 340, input component 350, output component 360, communication interface 370, and/or the like) may transmit, to the document rendering platform, a second request to search the electronic document for a search string, as described above.

As further shown in FIG. 5, process 500 may include receiving, from the document rendering platform, information related to a particular segment of the electronic document that contains the search string (block 560). For example, the client device (e.g., using processor 320, memory 330, storage component 340, input component 350, output component 360, communication interface 370, and/or the like) may receive, from the document rendering platform, information related to a particular segment of the electronic document that contains the search string, as described above.

As further shown in FIG. 5, process 500 may include rendering the particular segment that contains the search string using the document viewer application (block 570). For example, the client device (e.g., using processor 320, memory 330, storage component 340, input component 350, output component 360, communication interface 370, and/or the like) may render the particular segment that contains the search string using the document viewer application, as described above.

As further shown in FIG. 5, process 500 may include storing, in the cache associated with the document viewer application, one or more sets of segments of the electronic document that are adjacent to the particular segment that contains the search string within the electronic document (block 580). For example, the client device (e.g., using processor 320, memory 330, storage component 340, input component 350, output component 360, communication interface 370, and/or the like) may store, in the cache associated with the document viewer application, one or more sets of segments of the electronic document that are adjacent to the particular segment that contains the search string within the electronic document, as described above.

Process 500 may include additional implementations, such as any single implementation or any combination of implementations described below and/or in connection with one or more other processes described elsewhere herein.

In a first implementation, the second request may cause the document rendering platform to search individual segments of the electronic document until the search string is found.

In a second implementation, alone or in combination with the first implementation, the second request may cause the document rendering platform to search only a set of one or more segments of the electronic document that immediately follow, within the electronic document, the multiple segments stored in the cache associated with the document viewer application.

In a third implementation, alone or in combination with one or more of the first and second implementations, the client device, when rendering the particular segment that contains the search string, may further render a particular page that includes one or more static content elements and automatically adjust an orientation of the particular page based on a position of the one or more static content elements on the particular page.

In a fourth implementation, alone or in combination with one or more of the first through third implementations, the first request may cause the document rendering platform to partition the electronic document into a plurality of individual segments that individually satisfy the memory constraint associated with the document viewer application.

In a fifth implementation, alone or in combination with one or more of the first through fourth implementations, the client device, when rendering the particular segment that contains the search string, may further identify, in one or more pages of the particular segment, one or more accessibility elements that contain readable text and execute a screen reader application to generate audio corresponding to the readable text contained in the one or more accessibility elements.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
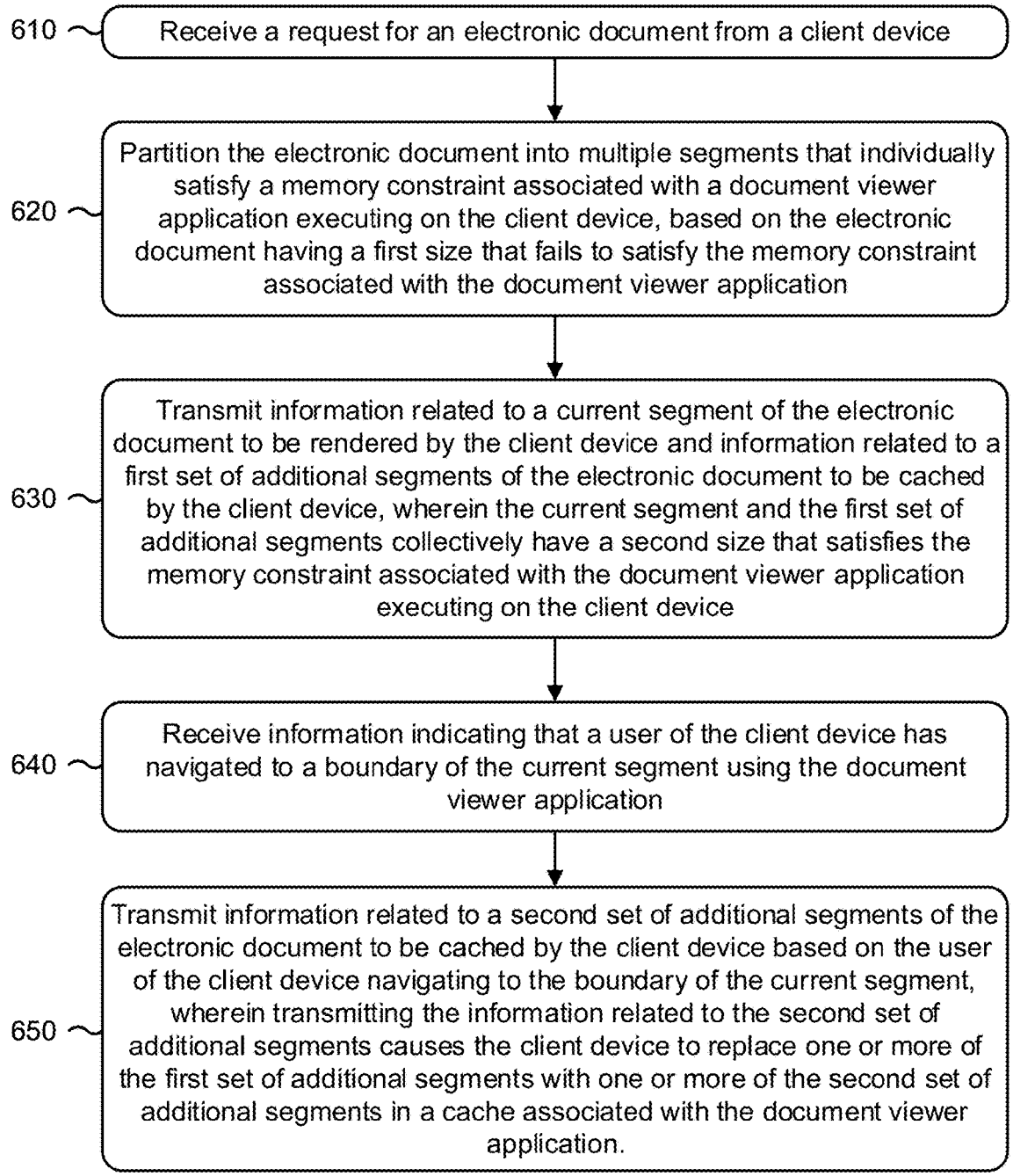

FIG. 6 is a flow chart of an example process 600 for dynamically rendering very large multi-format documents. In some implementations, one or more process blocks of FIG. 6 may be performed by a document rendering platform (e.g., document rendering platform 230). In some implementations, one or more process blocks of FIG. 6 may be performed by another device or a group of devices separate from or including the document rendering platform, such as a client device (e.g., client device 210), a document storage device (e.g., document storage device 220), and/or the like.

As shown in FIG. 6, process 600 may include receiving a request for an electronic document from a client device (block 610). For example, the document rendering platform (e.g., using computing resource 245, processor 320, memory 330, storage component 340, input component 350, output component 360, communication interface 370, and/or the like) may receive a request for an electronic document from a client device, as described above.

As further shown in FIG. 6, process 600 may include partitioning the electronic document into multiple segments that individually satisfy a memory constraint associated with a document viewer application executing on the client device, based on the electronic document having a first size that fails to satisfy the memory constraint associated with the document viewer application (block 620). For example, the document rendering platform (e.g., using computing resource 245, processor 320, memory 330, storage component 340, input component 350, output component 360, communication interface 370, and/or the like) may partition the electronic document into multiple segments that individually satisfy a memory constraint associated with a document viewer application executing on the client device, based on the electronic document having a first size that fails to satisfy the memory constraint associated with the document viewer application, as described above.

As further shown in FIG. 6, process 600 may include transmitting information related to a current segment of the electronic document to be rendered by the client device and information related to a first set of additional segments of the electronic document to be cached by the client device, wherein the current segment and the first set of additional segments collectively have a second size that satisfies the memory constraint associated with the document viewer application executing on the client device (block 630). For example, the document rendering platform (e.g., using computing resource 245, processor 320, memory 330, storage component 340, input component 350, output component 360, communication interface 370, and/or the like) may transmit information related to a current segment of the electronic document to be rendered by the client device and information related to a first set of additional segments of the electronic document to be cached by the client device, as described above. In some implementations, the current segment and the first set of additional segments may collectively have a second size that satisfies the memory constraint associated with the document viewer application executing on the client device.

As further shown in FIG. 6, process 600 may include receiving information indicating that a user of the client device has navigated to a boundary of the current segment using the document viewer application (block 640). For example, the document rendering platform (e.g., using computing resource 245, processor 320, memory 330, storage component 340, input component 350, output component 360, communication interface 370, and/or the like) may receive information indicating that a user of the client device has navigated to a boundary of the current segment using the document viewer application, as described above.

As further shown in FIG. 6, process 600 may include transmitting information related to a second set of additional segments of the electronic document to be cached by the client device based on the user of the client device navigating to the boundary of the current segment, wherein transmitting the information related to the second set of additional segments causes the client device to replace one or more of the first set of additional segments with one or more of the second set of additional segments in a cache associated with the document viewer application (block 650). For example, the document rendering platform (e.g., using computing resource 245, processor 320, memory 330, storage component 340, input component 350, output component 360, communication interface 370, and/or the like) may transmit information related to a second set of additional segments of the electronic document to be cached by the client device based on the user of the client device navigating to the boundary of the current segment, as described above. In some implementations, transmitting the information related to the second set of additional segments may cause the client device to replace one or more of the first set of additional segments with one or more of the second set of additional segments in a cache associated with the document viewer application.

Process 600 may include additional implementations, such as any single implementation or any combination of implementations described below and/or in connection with one or more other processes described elsewhere herein.

In a first implementation, the first set of additional segments may include one or more sets of segments of the electronic document that are adjacent to the current segment within the electronic document.

In a second implementation, alone or in combination with the first implementation, one or more of the first set of additional segments or the second set of additional segments may include one or more previously rendered segments of the electronic document.

In a third implementation, alone or in combination with one or more of the first and second implementations, the document rendering platform may receive, from the client device, a request to search the electronic document for a search string. In some implementations, the document rendering platform may transmit, to the client device, information related to a particular segment of the electronic document to be rendered by the client device based on the search string appearing in the particular segment.

In a fourth implementation, alone or in combination with one or more of the first through third implementations, the document rendering platform may search individual segments of the electronic document until the search string is found.

In a fifth implementation, alone or in combination with one or more of the first through fourth implementations, the document rendering platform may search only a set of one or more segments of the electronic document that are contiguous with one or more segments of the electronic document that are locally available at the client device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, and/or the like, depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    determining, by a device, a memory constraint associated with a document viewer application;
    transmitting, by the device, a request for an electronic document to a document rendering platform based on the electronic document having a first memory size that fails to satisfy the memory constraint associated with the document viewer application executing on the device;
    receiving, by the device, information related to a current segment of the electronic document to be rendered by the device and information related to a set of additional segments of the electronic document to be cached by the device,
        wherein the current segment of the electronic document and the set of additional segments of the electronic document collectively have a second memory size that satisfies the memory constraint associated with the document viewer application executing on the device,
        wherein the current segment of the electronic document and the set of additional segments of the electronic document comprise a portion of segments of the electronic document, the portion comprising less than all segments of the electronic document,
        wherein the set of additional segments of the electronic document includes a first subset of additional segments preceding the current segment of the electronic document and a second subset of additional segments succeeding the current segment of the electronic document, and
        wherein a first number of the first subset of additional segments and a second number of the second subset of additional segments is configurable based on a direction associated with a scrolling navigation behavior;
    rendering, by the device, a first set of pages in the current segment of the electronic document using the document viewer application;
    storing, by the device, the set of additional segments of the electronic document in a cache associated with the document viewer application; and
    rendering, by the device, a second set of pages contained in the set of additional segments of the electronic document based on an instruction to navigate to a boundary of the current segment using the document viewer application.

2. The method of claim 1, wherein the set of additional segments of the electronic document include one or more sets of segments of the electronic document that are adjacent to the current segment within the electronic document.

3. The method of claim 1, wherein the set of additional segments of the electronic document include one or more previously rendered segments of the electronic document.

4. The method of claim 1, wherein rendering one or more of the first set of pages or the second set of pages includes:
    rendering a particular page that includes one or more static content elements; and
    automatically adjusting an orientation of the particular page based on a position of the one or more static content elements on the particular page.

5. The method of claim 1, wherein the request for the electronic document causes the document rendering platform to partition the electronic document into multiple segments that individually satisfy the memory constraint associated with the document viewer application.

6. The method of claim 1, wherein:
    the document viewer application is a web browser, and
    the request for the electronic document causes the document rendering platform to convert the electronic document from a first format that lacks native support in the web browser to a second format that has native support in the web browser.

7. The method of claim 1, further comprising:
    identifying, in one or more of the first set of pages or the second set of pages, one or more accessibility elements that contain readable text; and
    using a screen reader application executing on the device to generate audio corresponding to the readable text contained in the one or more accessibility elements.

8. The method of claim 1, further comprising:
    transmitting, to the document rendering platform, a request to search the electronic document for a search string; and
    receiving information related to a next segment of the electronic document to be rendered based on the document rendering platform finding the search string in the next segment.

9. A device, comprising:
    one or more memories; and
    one or more processors communicatively coupled to the one or more memories, to:
        execute a document viewer application;
        determine a memory constraint associated with the document viewer application;
        transmit a first request for an electronic document to a document rendering platform based on the electronic document having a first memory size that fails to satisfy the memory constraint associated with the document viewer application;
        receive information related to multiple segments of the electronic document,
            wherein the multiple segments of the electronic document collectively have a second memory size that satisfies the memory constraint associated with the document viewer application, and
            wherein the multiple segments of the electronic document comprise a portion of segments of the electronic document, the portion comprising less than all segments of the electronic document;
        store the multiple segments of the electronic document in a cache associated with the document viewer application;
        transmit, to the document rendering platform, a second request to search the electronic document for a search string;

receive, from the document rendering platform, information related to a particular segment of the electronic document that contains the search string;
render the particular segment that contains the search string using the document viewer application; and
store, in the cache associated with the document viewer application, one or more sets of segments of the electronic document that are adjacent to the particular segment that contains the search string within the electronic document,
wherein the one or more sets of segments include a first subset of segments preceding the particular segment that contains the search string within the electronic document and a second subset of segments succeeding the particular segment that contains the search string within the electronic document, and
wherein a first number of the first subset of segments and a second number of the second subset of segments is configurable based on a direction associated with a scrolling navigation behavior.

10. The device of claim 9, wherein the second request causes the document rendering platform to search individual segments of the electronic document until the search string is found.

11. The device of claim 9, wherein the second request causes the document rendering platform to search only a set of one or more segments of the electronic document that immediately follow, within the electronic document, the multiple segments of the electronic document stored in the cache associated with the document viewer application.

12. The device of claim 9, wherein the one or more processors, when rendering the particular segment that contains the search string, are further to:
render a particular page that includes one or more static content elements; and
automatically adjust an orientation of the particular page based on a position of the one or more static content elements on the particular page.

13. The device of claim 9, wherein the first request causes the document rendering platform to partition the electronic document into a plurality of individual segments that individually satisfy the memory constraint associated with the document viewer application.

14. The device of claim 9, wherein the one or more processors, when rendering the particular segment that contains the search string, are further to:
identify, in one or more pages of the particular segment, one or more accessibility elements that contain readable text; and
execute a screen reader application to generate audio corresponding to the readable text contained in the one or more accessibility elements.

15. A method, comprising:
determining, by a device, a memory constraint associated with a document viewer application;
receiving, by the device, a request for an electronic document from a client device;
partitioning, by the device, the electronic document into multiple segments that individually satisfy the memory constraint associated with the document viewer application executing on the client device, based on the electronic document having a first memory size that fails to satisfy the memory constraint associated with the document viewer application;
transmitting, by the device, information related to a current segment of the electronic document to be rendered by the client device and information related to a first set of additional segments of the electronic document to be cached by the client device,
wherein the current segment and the first set of additional segments collectively have a second memory size that satisfies the memory constraint associated with the document viewer application executing on the client device, and
wherein the current segment of the electronic document and the first set of additional segments of the electronic document do not comprise all segments of the electronic document;
receiving, by the device, information indicating that a user of the client device has navigated to a boundary of the current segment using the document viewer application based on a direction associated with a scrolling navigation behavior; and
transmitting, by the device, information related to a second set of additional segments of the electronic document to be cached by the client device based on the user of the client device navigating to the boundary of the current segment,
wherein transmitting the information related to the second set of additional segments of the electronic document causes the client device to replace one or more of the first set of additional segments of the electronic document with one or more of the second set of additional segments of the electronic document in a cache associated with the document viewer application, and
wherein a first number of the first set of additional segments of the electronic document and a second number of the second set of additional segments of the electronic document is configurable based on the direction associated with the scrolling navigation behavior.

16. The method of claim 15, wherein the first set of additional segments of the electronic document include one or more sets of segments of the electronic document that are adjacent to the current segment within the electronic document.

17. The method of claim 15, wherein one or more of the first set of additional segments of the electronic document or the second set of additional segments of the electronic document include one or more previously rendered segments of the electronic document.

18. The method of claim 15, further comprising:
receiving, from the client device, a request to search the electronic document for a search string; and
transmitting, to the client device, information related to a particular segment of the electronic document to be rendered by the client device based on the search string appearing in the particular segment.

19. The method of claim 18, further comprising:
searching individual segments of the electronic document until the search string is found.

20. The method of claim 18, further comprising:
searching only a set of one or more segments of the electronic document that are contiguous with one or more segments of the electronic document that are locally available at the client device.

* * * * *